(12) United States Patent
Stanley (10) Patent No.: US 9,682,500 B2
(45) Date of Patent: Jun. 20, 2017

(54) INSERT MOLDED PARTS AND METHODS FOR FORMING THE SAME

(71) Applicant: Apple Inc., Cupertino, CA (US)

(72) Inventor: Craig M. Stanley, Campbell, CA (US)

(73) Assignee: Apple Inc., Cupertino, CA (US)

(*) Notice: Subject to any disclaimer, the term of this patent is extended or adjusted under 35 U.S.C. 154(b) by 628 days.

(21) Appl. No.: 14/108,148

(22) Filed: Dec. 16, 2013

(65) Prior Publication Data

US 2015/0092365 A1 Apr. 2, 2015

Related U.S. Application Data

(60) Provisional application No. 61/884,890, filed on Sep. 30, 2013.

(51) Int. Cl.
| | | |
|---|---|---|
| *B29C 45/14* | (2006.01) | |
| *B29C 45/16* | (2006.01) | |
| *B29L 31/34* | (2006.01) | |

(52) U.S. Cl.
CPC .... *B29C 45/14065* (2013.01); *B29C 45/1635* (2013.01); *B29C 45/1671* (2013.01); *B29L 2031/3425* (2013.01); *Y10T 428/23* (2015.01); *Y10T 428/239* (2015.01)

(58) Field of Classification Search
CPC ................................................. B29C 45/14065
USPC ........................................... 361/752; 264/255
See application file for complete search history.

(56) References Cited

U.S. PATENT DOCUMENTS

| | | | | |
|---|---|---|---|---|
| 5,804,886 | A | * | 9/1998 | Danielson ............ H01H 19/585 29/622 |
| 5,959,557 | A | * | 9/1999 | Lim ..................... H03K 17/972 341/176 |
| 6,227,872 | B1 | * | 5/2001 | Stephenson .......... H01R 13/405 439/500 |
| 6,468,458 | B1 | | 10/2002 | Anderson et al. |
| 6,903,924 | B1 | | 6/2005 | Tyner |
| 8,514,494 | B2 | * | 8/2013 | Alcazar ............ B29C 45/14434 264/2.5 |
| 8,557,158 | B2 | | 10/2013 | Shen et al. |
| 2005/0243532 | A1 | * | 11/2005 | Wang ..................... H05K 5/026 361/797 |
| 2006/0024575 | A1 | * | 2/2006 | Robinson .......... B29C 45/14467 429/185 |
| 2006/0084289 | A1 | * | 4/2006 | Ziberna ................ H05K 9/0022 439/67 |

(Continued)

FOREIGN PATENT DOCUMENTS

EP   1072379 EP   1/2003

*Primary Examiner* — David Warren
(74) *Attorney, Agent, or Firm* — Downey Brand LLP (57) ABSTRACT

The embodiments described herein relate to insert molding methods. The methods involve partially or fully encasing an insert within a thermoplastic material, forming a composite part that includes the insert and the molded thermoplastic material. Methods described provide a number of improvements over traditional insert molding techniques. In specific embodiments, a two-shot molding process is used whereby a first shot is formed on a first portion of the insert and a second shot is formed on a second portion of the insert. The insert molding processes can be performed using a single mold during the first and second injection molding processes.

20 Claims, 12 Drawing Sheets

(56) References Cited

U.S. PATENT DOCUMENTS

| | | | |
|---|---|---|---|
| 2006/0216961 A1* | 9/2006 | Suda | H01R 12/00 439/74 |
| 2009/0097802 A1* | 4/2009 | Tamura | G02B 6/4201 385/85 |
| 2011/0107835 A1* | 5/2011 | Campbell | B29C 45/14655 73/488 |
| 2011/0111609 A1* | 5/2011 | Goto | H01R 12/585 439/83 |
| 2011/0278312 A1 | 11/2011 | Zadesky et al. | |
| 2012/0066900 A1* | 3/2012 | Nall | F21V 29/004 29/832 |
| 2012/0133087 A1 | 5/2012 | Rinne et al. | |
| 2013/0088406 A1* | 4/2013 | Hamada | H01Q 1/36 343/893 |
| 2013/0122754 A1* | 5/2013 | Golko | H01R 13/516 439/676 |
| 2013/0328730 A1 | 12/2013 | Guterman et al. | |
| 2016/0141771 A1* | 5/2016 | Little | H01R 13/405 439/577 |
| 2016/0146900 A1* | 5/2016 | Yu | G01R 31/3696 324/437 |
| 2016/0202668 A1* | 7/2016 | Chen | G04G 21/04 368/10 |

* cited by examiner

INSERT MOLDED PARTS AND METHODS FOR FORMING THE SAME

CROSS-REFERENCE TO RELATED APPLICATIONS

This application claims priority to U.S. Provisional Application No. 61/884,890, filed Sep. 30, 2013 and entitled "INSERT MOLDING METHODS," which is incorporated herein by reference in its entirety.

FIELD

This disclosure relates generally to injection molded parts and injection molding methods. In particular, tooling concepts for improving insert molding methods are disclosed.

BACKGROUND

Injection molding generally involves melting thermoplastic or thermosetting material and injecting the melted material into a mold cavity. The volume of material that is used to fill the mold cavity is referred to as a shot. The thermoplastic material is then allowed to cool and take on a shape corresponding to the mold cavity. One type of injection molding, often referred to as insert molding or overmolding, involves injection molding material around a separate part, referred to as an insert piece. The resultant part is a composite part that includes the insert piece and the molded material. Insert molding generally involves a two-shot or multi-shot technique where two or more injection molding processes are performed on a single part. A two-shot method involves injection molding one part, transferring the part to a second mold as an insert, and molding the second component against the first. Multi-shot methods involve multiple injection steps. In some cases, two-shot and multi-shot methods can be processed on specialized injection molding machines that have two or more injection units. These two-shot and multi-shot molding machines are expensive and highly specialized for producing particular parts. What are needed are simple and inexpensive alternatives to traditional insert molding methods.

SUMMARY

According to one embodiment, a method for forming a composite part having an insert and a molded portion is described. The method includes securing the insert within a mold using at least one support mold. The insert has a first surface in contact with the support mold and an exposed second surface. The method also includes forming a first part of the molded portion by injecting a first resinous material into the mold. During the injecting, the first resinous material covers the second surface of the insert. The method additionally includes removing the support mold from the first surface of the insert exposing the first surface of the insert and forming a recess within the first part of the molded portion. The method further includes forming a second part of the molded portion by injecting a second resinous material into the recess and over the first surface of the insert such that the first surface and second surface of the insert are encased within the molded portion.

According to another embodiment, a composite part is described. The composite part includes an insert having a first surface and a second surface. The composite part also includes a molded piece formed using an injection molding process. The molded piece includes a first molded portion molded onto the second surface of the insert. The molded piece also includes a second molded portion molded onto the first surface of the insert and onto at least a section of the first molded portion. The molded piece also includes an indentation disposed within the first molded portion. The indentation is formed during the injection molding process.

According to a further embodiment, an electronic device is described. The electronic device includes a printed circuit board having a first surface and a second surface. The electronic device also includes a molded piece at least partially encasing the printed circuit board therein. The molded piece is formed using a molding process. The molded piece includes a first molded portion disposed on the second surface of the printed circuit board. The molded piece also includes a second molded portion disposed on the first surface of the printed circuit board and disposed on at least a section of the first molded portion. The molded piece further includes an indentation disposed within the first molded portion. The indentation is formed during the molding process.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Representative applications of methods according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

The present application describes various methods and apparatuses used in injection molding processes. In particular, improved insert molding techniques that are simple and inexpensive alternatives to traditional insert molding techniques are described. In specific embodiments, a two-shot molding technique is performed using a single mold cavity, saving machine costs and production time during manufacture. Methods described are well suited in the manufacture of molded parts of electronic devices including desktop computers, laptop computers, smart phones, and media players, such as those designed and sold by Apple Inc. headquartered in Cupertino, Calif.

Insert molding is a molding process whereby one portion of a part, referred to as an insert, is partially or fully encased within a thermoplastic or resinous material. The insert molded part is a composite part that includes the insert and the molded thermoplastic material. The insert can be made of any suitable material, including metal, glass, ceramic, or a combination of different materials. In some cases, the insert is made of a thermoplastic material similar to thermoplastic material that is molded around the insert. In some cases, the insert is an electronic component, such as printed circuit board (PCB) or a battery. In some applications, encasing electronic components within thermoplastic material can be used to create a watertight barrier between the electronic component and an outer environment.

In order to encase exposed surfaces of an insert using injection molding techniques, at least two injection molding steps are required. These methods are referred to as two-shot or multi-shot molding processes. A traditional two-shot process involves holding the insert and securing the insert within a first mold. A first shot of thermoplastic material is then injected into the first mold, encasing a portion of the insert within the first shot of thermoplastic material. The first mold is then opened and the part is removed from the first mold. The part is then held at a location on the first shot portion of the part and secured within a second mold. A second shot of thermoplastic material is then injected into the second mold to complete the composite part. In some cases, the transfer to the second mold involves moving the part to another tool. In other cases, the first and second molds are part of a multi-cavity mold on a specialized two-shot injection tool. The tool is configured to rotate the mold from the first cavity to the second cavity between injections. These two-shot injection molding tools can be very expensive and are often customized to produce specific parts. In addition, transferring the part from a first to a second mold can create opportunity for moisture to form on the surfaces of the part, diminishing the quality of the seal between the first and second shots.

Figure 1A:
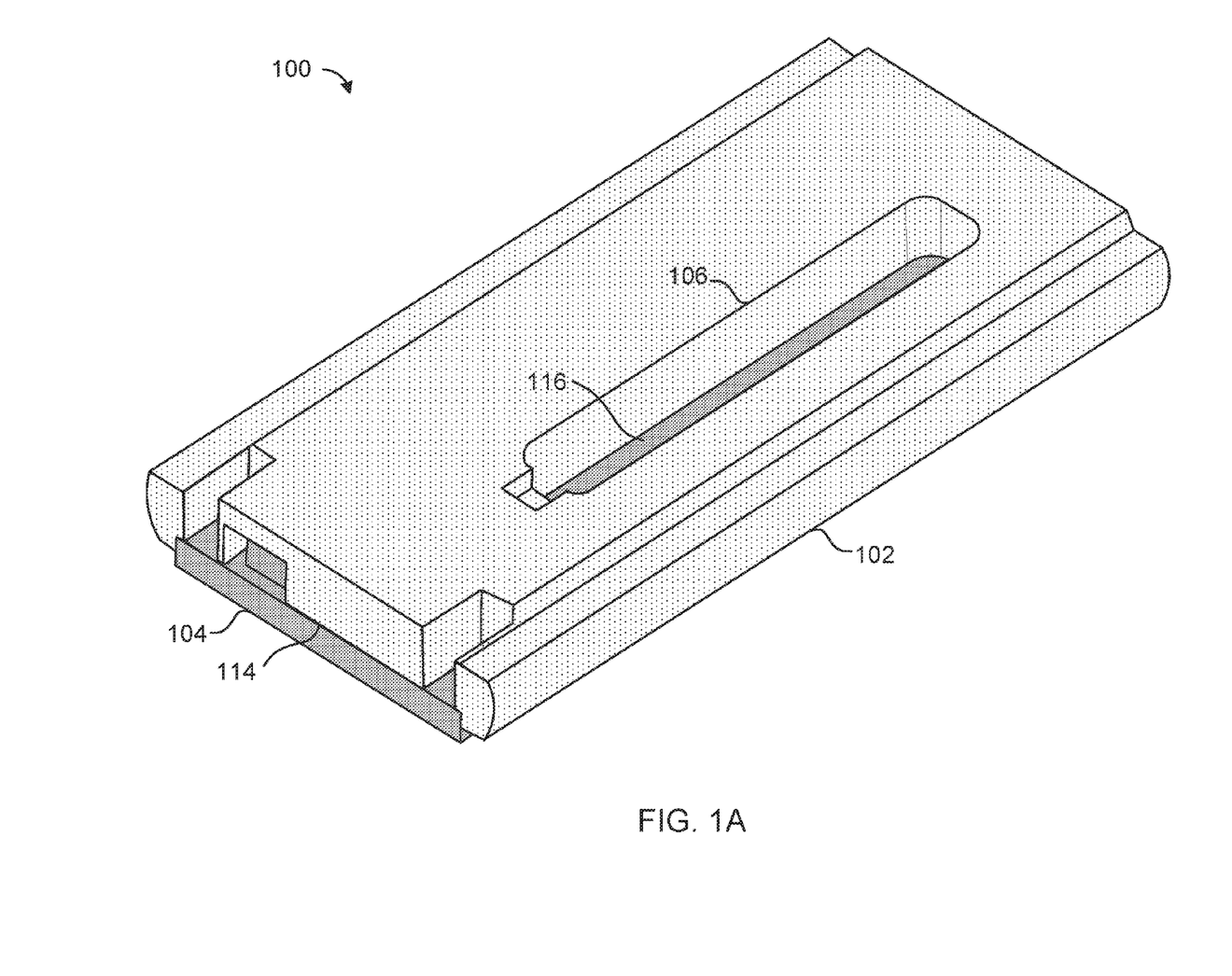
FIGS. 1A and 1B show perspective views of a part at different stages of manufacture using a two-shot insert molding method in accordance with described embodiments.
Figure 1B:
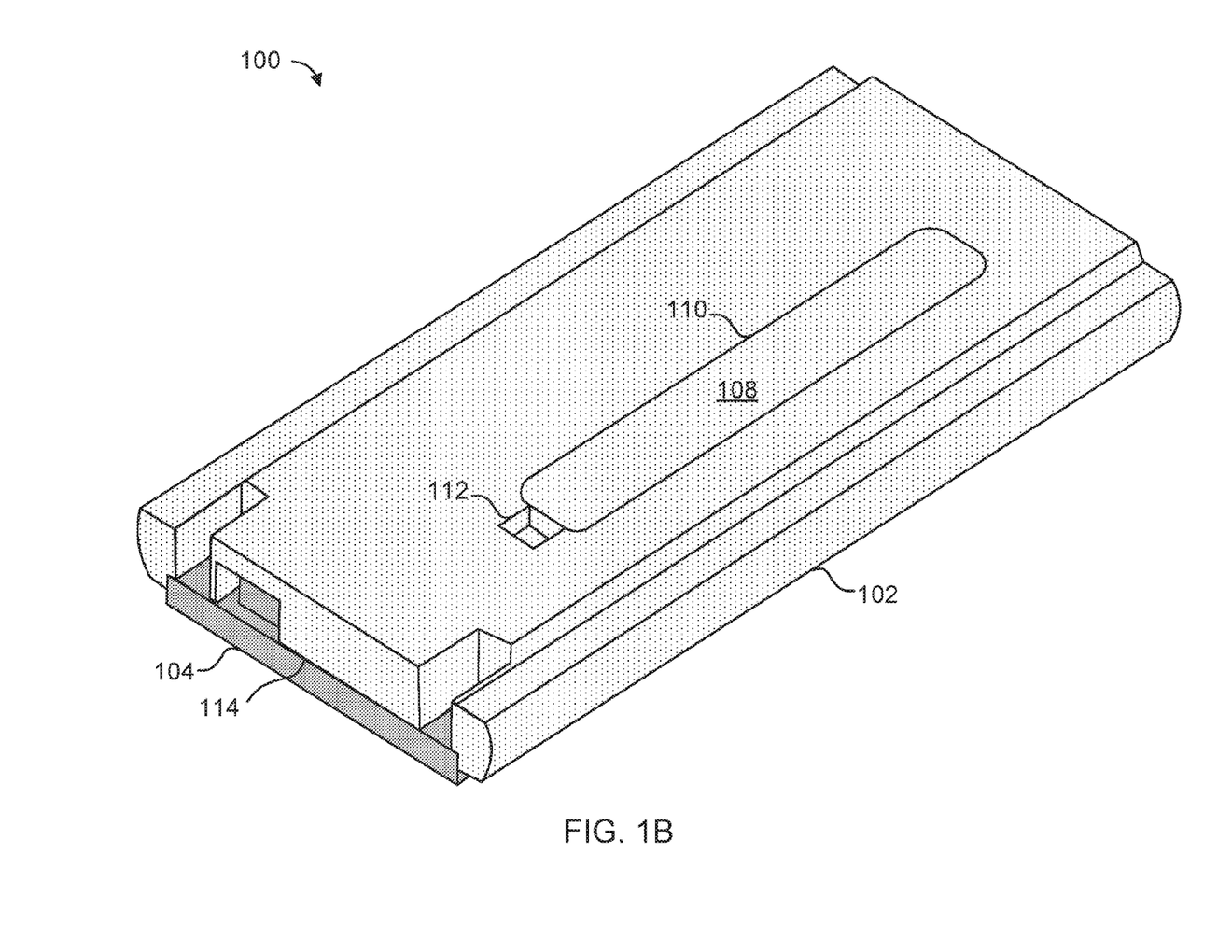

Described herein are improved insert molding techniques designed to encase an exposed surface of an insert within a thermoplastic material without the use of multiple molds or cavities. FIGS. 1A and 1B show perspective views of part 100 at different stages of manufacture using an insert molding method in accordance with described embodiments. FIG. 1A shows part 100 after a first shot injection is performed. Part 100 includes insert 104, which is encased within first shot 102 (which can be referred to as a first portion). In the embodiment shown, insert 104 is an electronic component, specifically a printed circuit board (PCB). It should be noted that insert 104 is not limited to any particular type of component and that any suitable insert can be used. In some embodiments, the insert is a different type of electronic component, such as a battery. In other embodiments, the insert is a non-electronic component, such as a piece of metal, glass, ceramic, etc. In some embodiments, multiple inserts are used. First shot 102 can be made of any suitable moldable material, such as any suitable thermoplastic materials.

As shown at FIG. 1A, first shot 102 is disposed on a first surface area 114 of insert 104 and includes recess 106, which provides access to a second surface area 116 of insert 104. Recess 106 corresponds to a support mold used during the molding process and that will be described below in detail. Note that in traditional two-shot injection molding processes, part 100 would be removed from a first mold and transferred to a second mold for injection of the second shot. This transfer would allow the plastic of first shot 102 to cool making the bond and seal for the second shot less effective.

FIG. 1B shows part 100 after a second shot injection is performed. As shown, second shot 108 (which can be referred to as a second portion) is inserted within recess 106, with interface 110 defining the junction between first shot 102 and second shot 108. Thus, second shot 108 is disposed on second surface area 116 of insert 104 by way of recess 106. Methods described herein make it possible to form second shot 108 within recess 106 without transferring part 100 to a second mold. In addition, the methods described herein can be used to form first shot 102 and second shot 108 out of the same stock of thermoplastic material, thereby allowing first 102 and second 108 shots to match in texture and color. In some embodiments, first 102 and second 108 shots match such that interface 110 is not visible after the part is complete. It should be noted, however, that methods described herein are not limited to first 102 and second 108 shots made of the same material. In some embodiments, first 102 and second 108 shots are made of different materials. First 102 and second 108 shots can have the same or different colors. Dimple 112 is an indentation that corresponds to a gate portion of a runner system used during the second shot injection and will be described below in detail.

Figure 2:
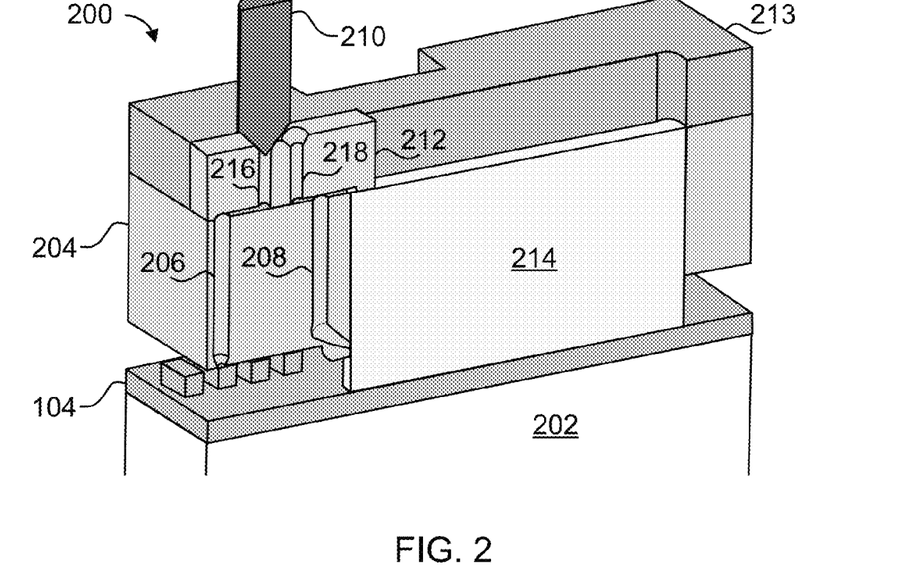
FIGS. 2-10 show cross-section views of an injection molding system during different stages of manufacture of forming the part shown in FIGS. 1A and 1B.

FIGS. 2-10 show cross-section views of an injection molding system 200 during different stages of manufacture of part 100. In should be noted that for illustrative purposes, FIGS. 2-10 are cross-section views that show half of the molding system 200 and part 100. FIG. 2 shows molding system 200 with insert 104 placed within mold 202 and ready for injection of a first shot. Note that for illustrative purposes, only a bottom portion of mold 202 is shown and not side portions of mold 202. Molding system 200 includes runner mold 204, resin flow director 212, top gate 210, support mold 214, and top frame 213. Support mold 214 is positioned at a first position on a surface of insert 104 to press down on and secure insert 104 within mold 202 during the first shot injection. Runner mold 204 includes first runner 206 and second runner 208, which direct the flow of resin during a first shot and second shot, respectively. Resin flow director 212 includes first channel 216 and second channel 218, which direct the flow of resin during a first shot and second shot, respectively.

Figure 3:
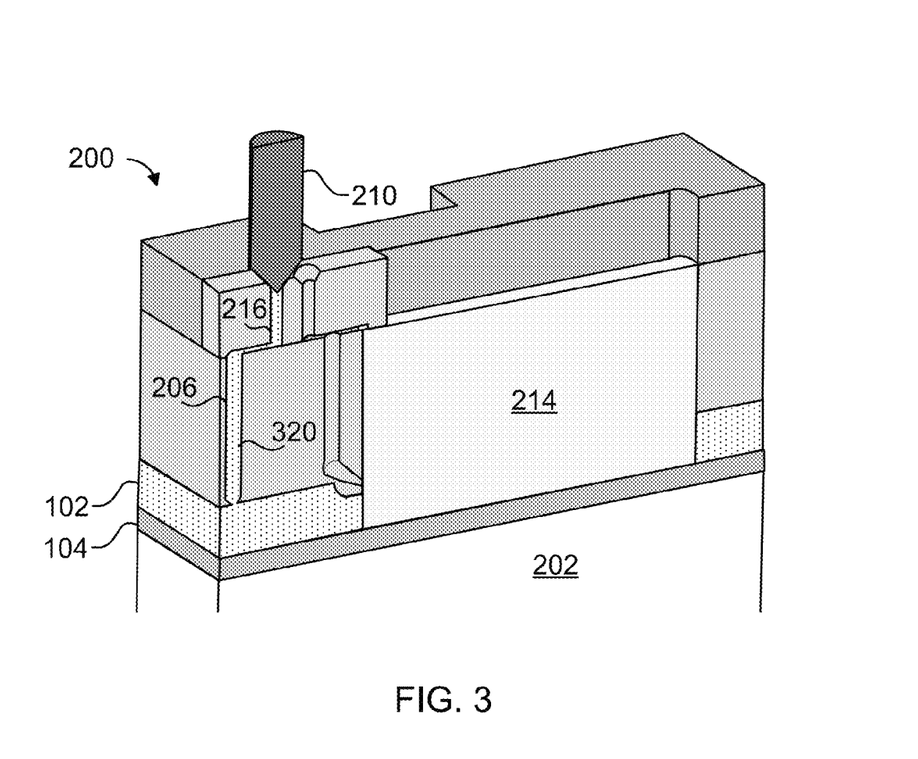

FIG. 3 shows molding system 200 during a first shot injection. As shown, resin flow director 212 directs resin 320 to flow from top gate 210, through first channel 216, through first runner 206, and into mold 202, forming first shot 102. Support mold 214 remains on the surface of and secures insert 104 during the first shot injection. After the first shot injection, first shot 102 is allowed to cool until it is sufficiently firm so as not to deform during a second shot injection.

Figure 4:
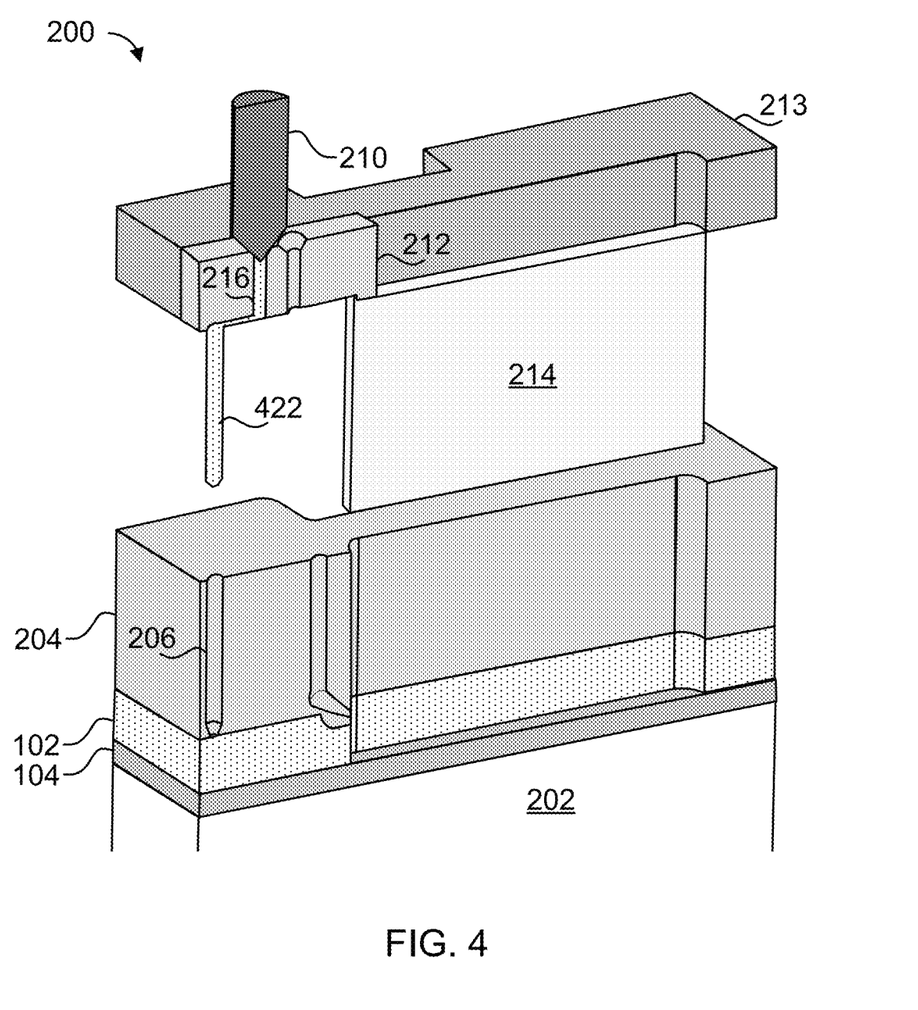
Figure 5:
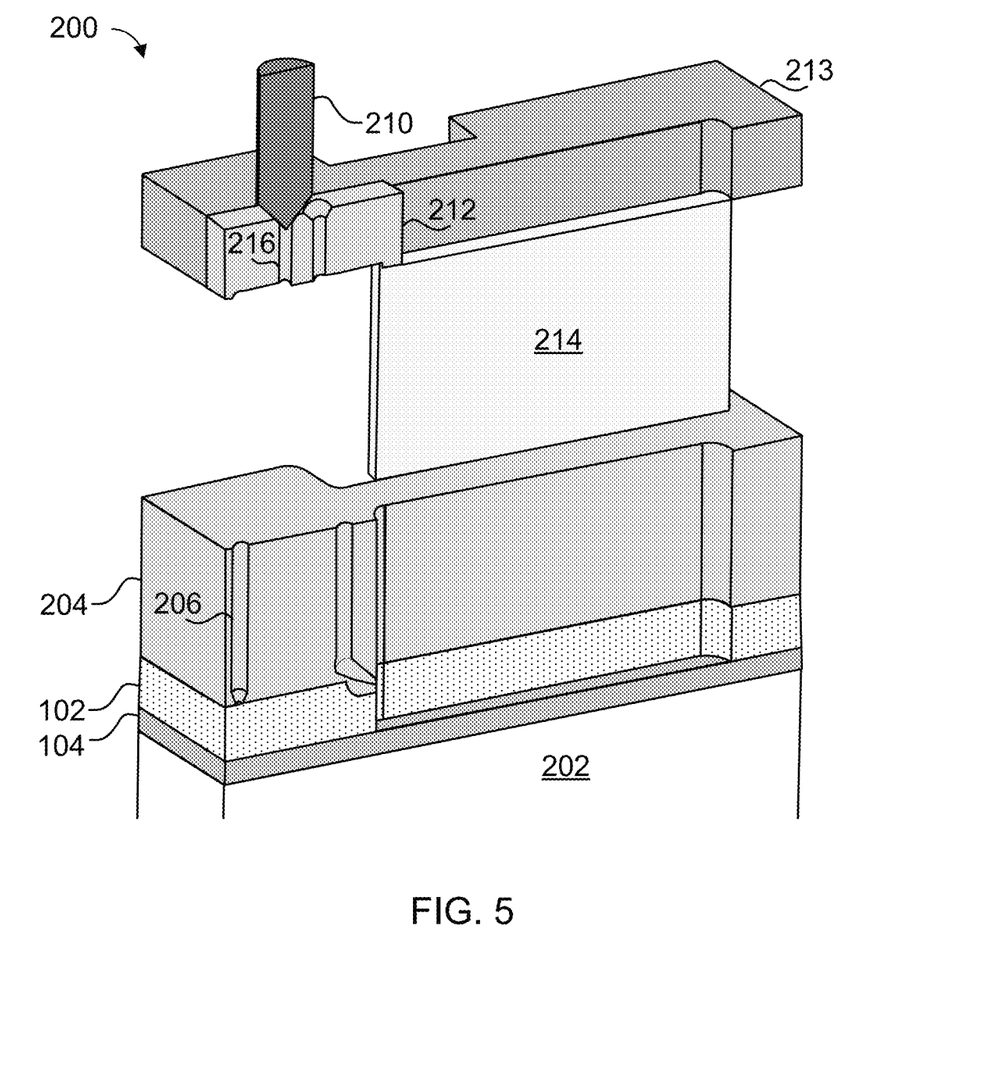

FIG. 4. shows molding system 200 after first shot 102 is complete and has begun transition to a configuration for a second shot injection. Runner mold 204 is allowed to remain situated on first shot 102 while top gate 210, flow director 212, support mold 214, and top frame 213 are moved up. As shown, sprue 422, which is the hardened portion of resin left within runner 206 and channel 216, is separated from first shot 102. At FIG. 5, sprue 422 is removed from molding system 200 and discarded. Sprue 422 can be removed using any suitable method, such as by a robotic mechanism that grabs and removes sprue 422 from system 200.

Figure 6:
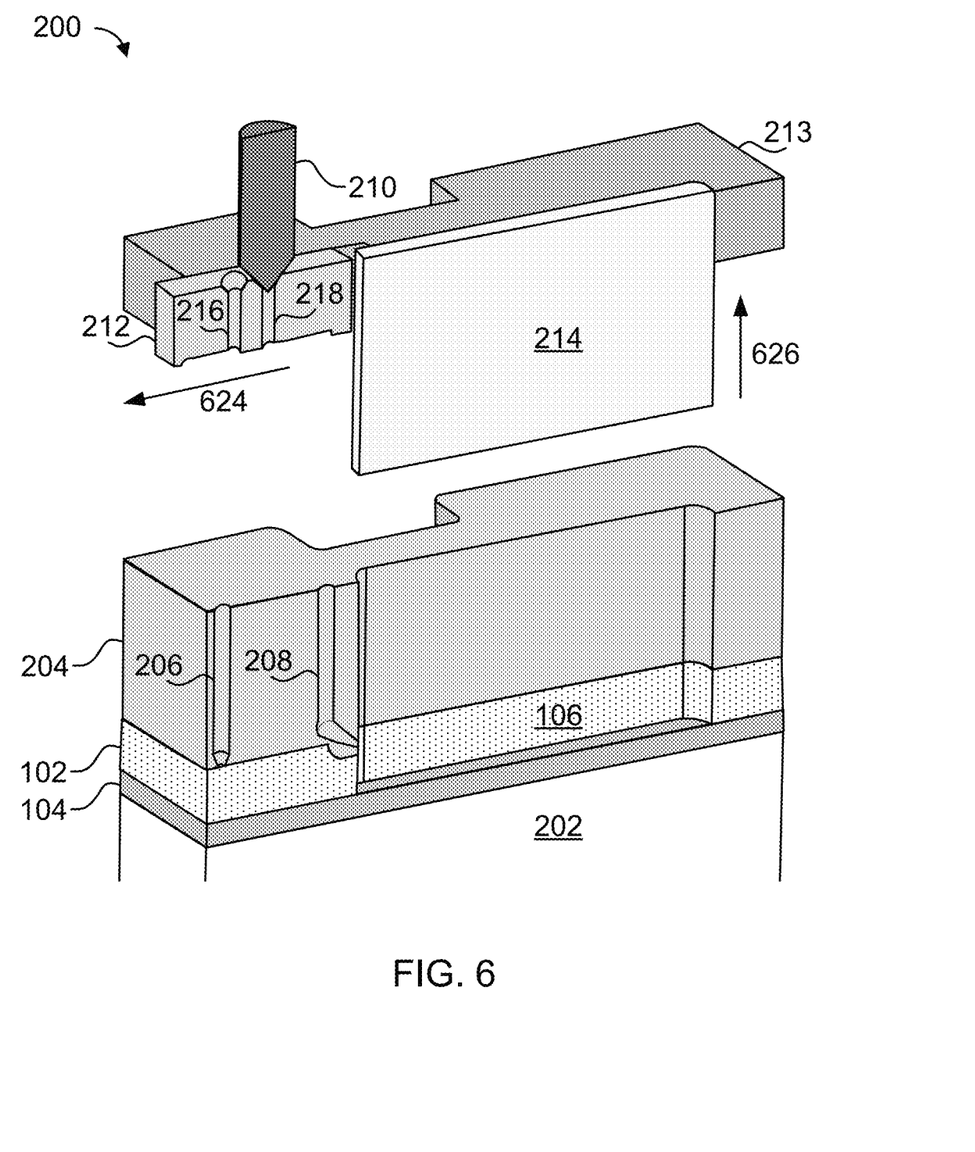

FIG. 6 shows resin flow director 212 displaced to a second position such that top gate 210 is positioned to inject resin into channel 218 of resin flow director 212. In molding system 200, resin flow director 212 is configured to be displaced by sliding action 224. Sliding action 624 can be executed using any suitable method, including manual movement, electronic or hydraulic activation as part of system 200, or by aid of a robot. In other embodiments, resin flow director 212 can be designed to move in a different motion, such as by rotation. In some embodiments, sliding action 624 of resin flow director 212 is done simultaneously with removal of sprue 422 (shown in FIG. 4). That is, sprue 422 can be forced or sheared away from resin flow director 212 during sliding 624, eliminating a separate sprue 422 removal procedure.

In addition to sliding action 624 of resin flow director 212, support mold 214 is moved upward 626 relative to top frame 213 to a second position. Moving support mold 214 upward 626 in the second position will allow recess 106 to form within first shot 102. The upward 626 movement of support mold 214 can be executed using any suitable method, including manual movement, electronic or hydraulic activation as part of system 200, or with use of a robot. In some embodiments, resin flow director 212 and support mold 214 are mechanically coupled such that sliding movement 624 and upward movement 626 are simultaneously activated using a single mechanism.

Figure 7:
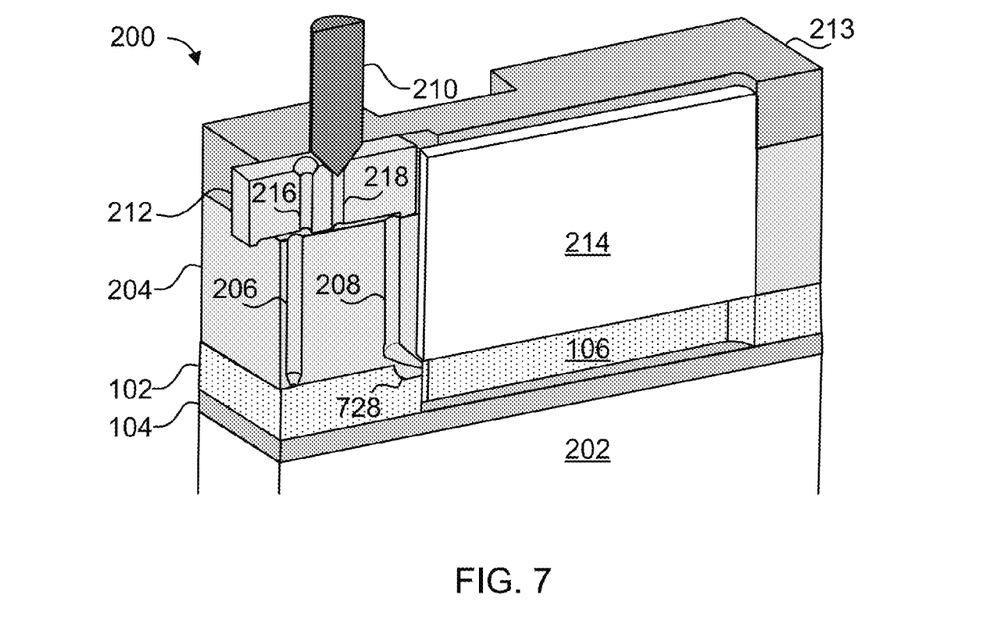

FIG. 7 shows molding system 200 configured for a second shot injection. Top gate 210, flow director 212, support mold 214, and top frame 213 are moved back down over first shot 102. Gate portion 728, which is a protruding portion of runner mold 204 and allows the second shot injection to travel through second runner 208 to recess 106, is allowed to descend back into its same position during the first shot injection. As shown, support mold 214 is positioned at a second position, different than the first position during the first shot injection. In the second position, support mold 214 is suspended above recess 106 so that the second shot can be injected into recess 106. In addition, resin flow director 218 is positioned at its second position to allow resin to flow from top gate 210 through second channel 218 and second runner 208 into recess 106.

Figure 8:
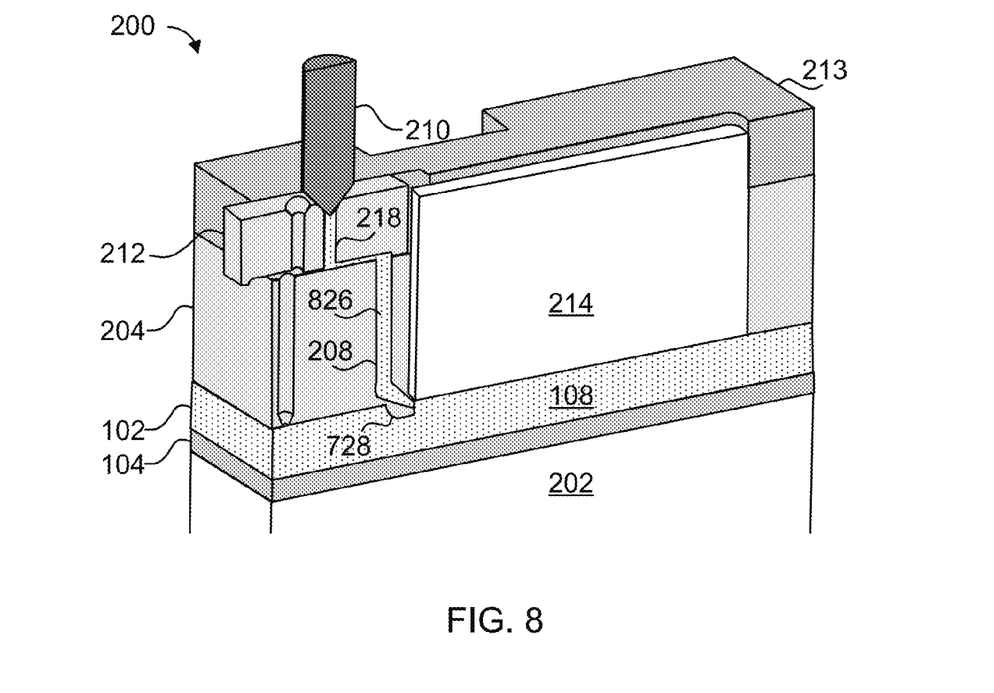
Figure 9:
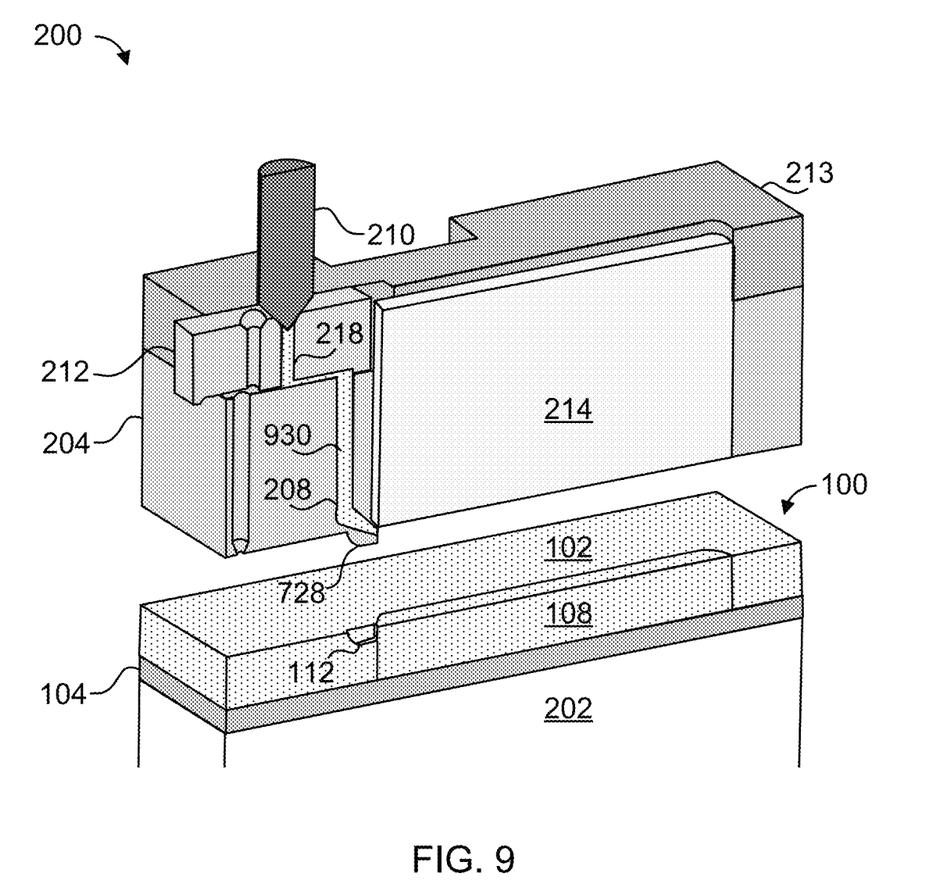
Figure 10:
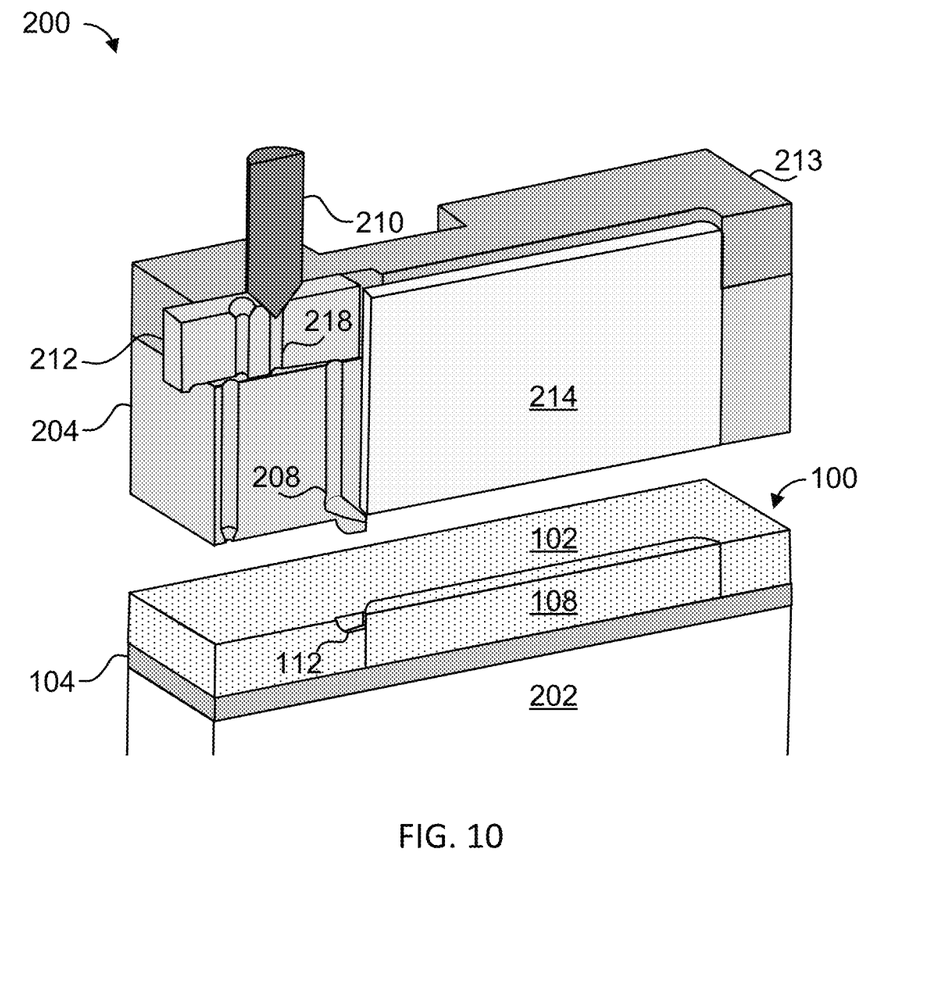

FIG. 8 shows molding system 200 during a second shot injection. As shown, resin flow director 212 directs resin 826 to flow from top gate 210, through second channel 218, through second runner 208, and into recess 106, forming second shot 108. FIG. 9 shows molding system 200 after second shot 108 is sufficiently cooled and hardened for removal without deformation. Dimple 112, corresponding to gate portion 728, remains within part 100. Runner mold 204, top gate 210, resin flow director 212, support mold 214, and top frame 213 are moved up out of mold 202. As shown, sprue 930, which is the hardened portion of resin left within runner 208 and channel 218, is separated from second shot 108. Part 100 is ready for removal from mold 202 and molding system 200. At FIG. 10, sprue 930 is removed from molding system 200 and discarded. Sprue 930 can be removed using any suitable method, such as by a robotic mechanism that grabs and removes sprue 930 from system 200. Injection molding system 200 is now ready for injection molding of another part.

Figure 11:
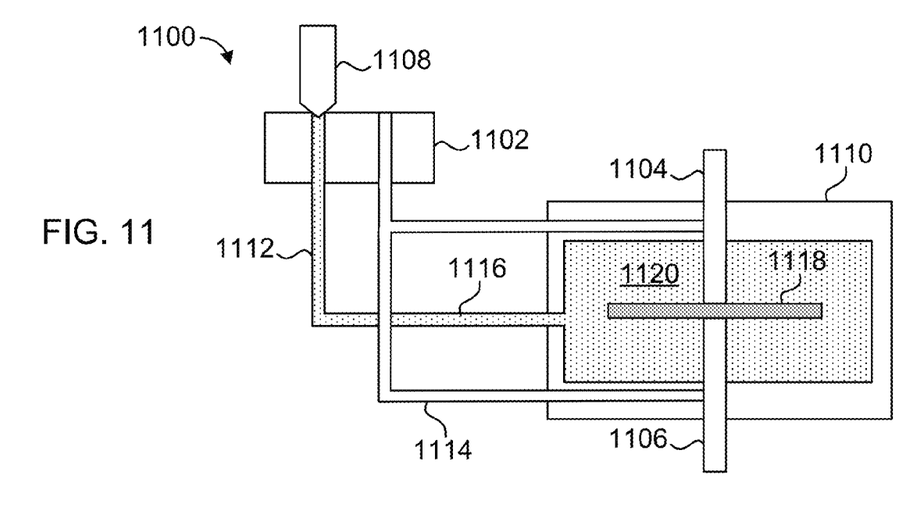
FIGS. 11-14 show schematic views of an injection molding system during different stages of manufacture of forming another part.

In another embodiment, the insert can be fully encased within a thermoplastic material. FIGS. 11-15 show schematic views of an injection molding system 1100 during different stages of manufacture of part 1101. Injection molding system 1100 is similar to injection molding system 200 described above but with additional features that allow a resinous material to encase all sides of an insert. FIG. 11 shows molding system 1100 during a first shot injection. Molding system 1100 includes resin flow director 1102, first support mold 1104, second support mold 1106, top gate 1108, and mold 1110. A top frame, similar to top frame 213 described above, and a runner mold, similar to runner mold 204 described above, are not shown for simplicity purposes. Resin flow director 1102 is configured to direct the flow of resin from top gate 1108 though either a first runner system 1112 or a second runner system 1114. First runner system 1112 is configured to allow resin to flow during a first shot injection. Second runner system 1114 is configured to allow resin to flow during a second shot injection.

Prior to the first shot injection, insert 1118 is secured within mold 1110 on one side by first support mold 1104 and on another side by second support mold 1106. In addition, resin flow director 1102 is arranged to direct the flow of resin from top gate 1108 through first runner system 1112. During a first shot injection, resin 1116 flows from top gate 1108, through first runner system 1112, and into mold 1110, forming first shot 1120 surrounding insert 1118. As shown, after the first shot injection is complete and first shot 1120 is sufficiently hardened, remaining resin 1116 (sprue) within first runner system 1112 can be removed.

Figure 12:
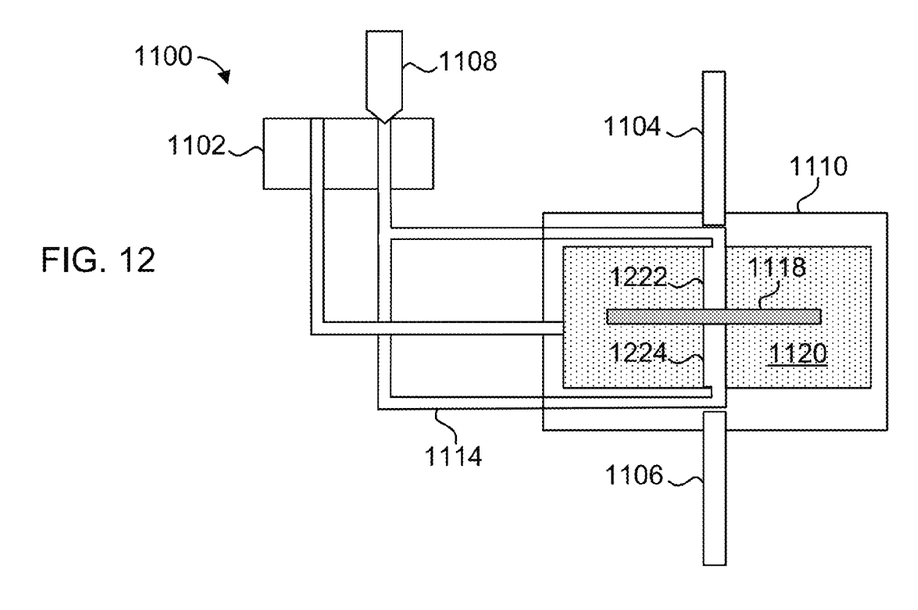

FIG. 12 shows molding system 1100 prepared for a second shot injection. First support mold 1104 and second support mold 1106 are moved away from the surface of insert 1118 since first shot 1120 now provides support for insert 1118 within mold 1110. As shown, removal of first support mold 1104 and second support mold 1106 from insert 1118 creates cavities 1222 and 1224, respectively. Cavities 1222 and 1224 are voids within first shot 1120 in which the second shot will be formed. In addition, resin flow director 1102 is arranged to direct the flow of resin from top gate 1108 though second runner system 1114.

Figure 13:
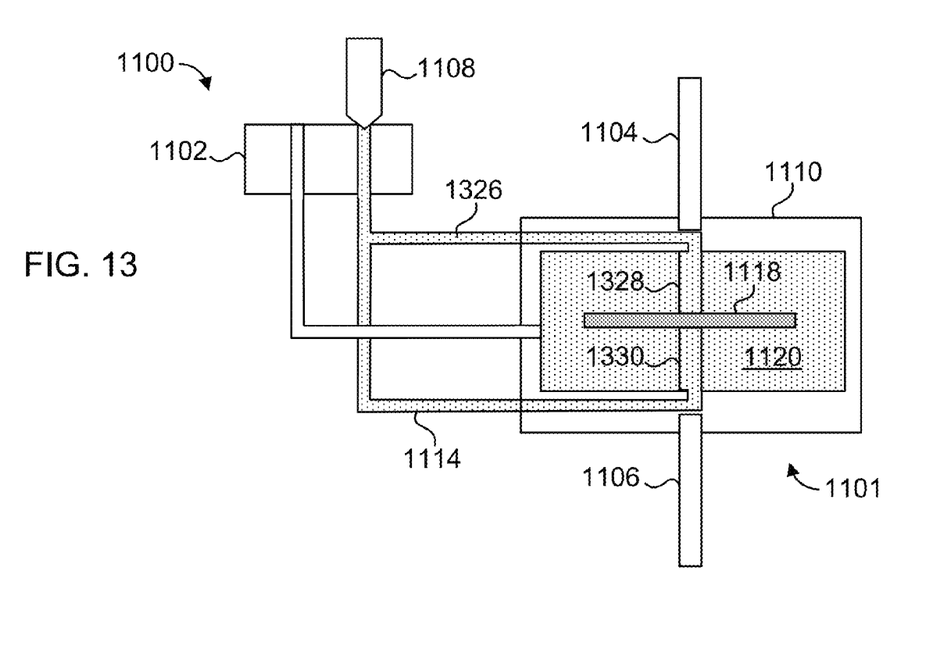

FIG. 13 shows molding system 1100 during a second shot injection. During the second shot injection, resin flow director 1102 allows resin 1326 to flow from top gate 1108, through second runner system 1114, and into cavities 1222 and 1224, forming top second shot portion 1328 and bottom second shot portion 1330. After the second shot injection is complete and top second shot portion 1328 and bottom second shot portion 1330 are sufficiently hardened, composite part 1101 is complete and can be removed. In addition, remaining resin 1326 (sprue) within second runner system 1114 can be removed and molding system 1100 is ready for producing another part.

Figure 14:
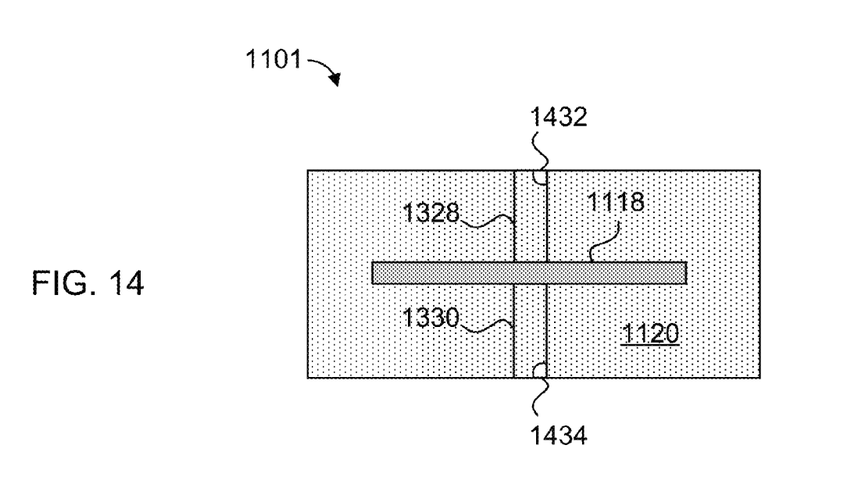

FIG. 14 shows completed composite part 1101. Composite part 1101 includes insert 1118 that is fully encased within a resinous material, which includes first shot 1120, top second shot portion 1328, and bottom second shot portion 1330. In some embodiments, first shot 1120, top second shot portion 1328, and bottom second shot portion 1330 are made of the same stock of resin such that an interface between the first and second shot portions is not visible. Dimples 1432 and 1434, corresponding to gate portions, similar to gate portion 728 describe above with reference to part 200 of FIGS. 2-10, can exist on part 1100.

Note that embodiments described above are for illustrative purposes and are not representative of all possible embodiments, as would be apparent to a person of skill in the art. For example, multiple-shot insert molding methods involving more than two shots can be performed. In addition, multiple inserts can be encased within a thermoplastic material using the methods described above.

Figure 15:
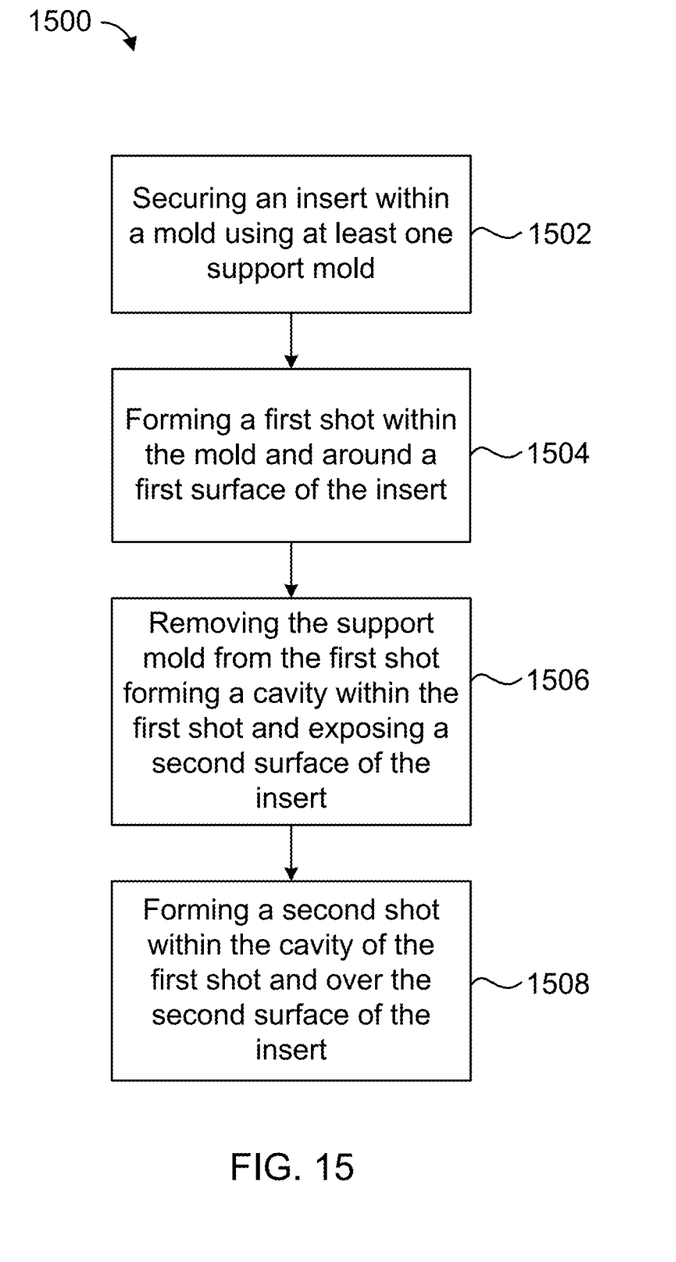
FIG. 15 shows a flowchart indicating an insert molding process in accordance with described embodiments.

FIG. 15 shows flowchart 1500 indicating an insert molding process to form a composite part in accordance with described embodiments. At 1502, an insert is secured within a mold using at least one support mold. The support mold can be configured to removably couple to the insert, such as by pressing a surface of the support mold against a surface of the insert. In some embodiments, two support molds are used. At 1504, a first shot is formed within the mold and around a first surface of the insert. In some embodiments, this is accomplished by injecting a resinous material while in liquid form into the mold. The support mold can secure the insert in place during injection of the resinous material. After the injection process is complete, the resinous material can be allowed to sufficiently cool and harden.

At 1506, the support mold is removed from the first shot, forming a recess within the first shot and exposing a second surface of the insert. In addition, the molding tool or system can be adjusted to prepare for a second shot injection. This can be accomplished, for example, using a resin flow director that directs the flow of resin between a first runner system during the first shot injection and a second runner system during a second shot injection. Thus, prior to the second shot injection, the resin flow director can be adjusted to allow resin to flow through the second runner system. At 1508, a second shot is formed within the recess formed by the support structure and over the second surface of the insert. In some embodiments, this is accomplished by injecting a resinous material while in liquid form into the recess. After the resinous material is allowed to sufficiently cool and harden, the composite part is complete and can be removed from the mold.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for forming a composite part having an insert and a molded piece, the method comprising:
    securing the insert within a mold using a support mold, the insert having a first surface area and a second surface area, wherein the support mold covers the second surface area;
    forming a first portion of the molded piece on the first surface area by injecting a first resinous material into the mold and onto the first surface area;
    removing the support mold from the insert, thereby exposing the second surface area of the insert via a recess within the first portion; and
    forming a second portion of the molded piece by injecting a second resinous material through a gate portion of the mold into the recess and onto the second surface area, wherein the gate portion forms an indentation within molded piece.

2. The method as recited in claim 1, wherein the first portion of the molded piece and the second portion of the molded piece are composed of the same thermoplastic material.

3. The method as recited in claim 1, wherein forming the first and second portions of the molded piece comprises partially encasing the insert within the molded piece.

4. The method as recited in claim 1, wherein forming the first and second portions of the molded piece comprises substantially fully encasing the insert within the molded piece.

5. The method as recited in claim 1, wherein injecting the first resinous material comprises injecting the first resinous material through a first runner system and injecting the second resinous material comprises injecting the second resinous material through a second runner system, wherein the first runner system is different than the second runner system.

6. The method as recited in claim 1, wherein the mold includes more than one gate portion such that more than one indentation is formed within the molded piece.

7. The method as recited in claim 1, wherein forming the first portion and the second portion involves forming a watertight barrier between at least a portion of the insert and an outer environment.

8. A composite part, comprising:
    an insert having a first surface area and a second surface area; and
    a molded piece formed using an injection molding process, the molded piece comprising:
        a first portion disposed on the first surface area of the insert, the first portion including a recess that provides access to the second surface area of the insert,
        a second portion disposed on the second surface area of the insert by way of the recess, and
        an indentation disposed within the first portion, the indentation formed during the injection molding process.

9. The composite part as recited in claim 8, wherein the first portion and the second portion comprise the same thermoplastic material.

10. The composite part as recited in claim 8, wherein the insert is partially encased within the molded piece.

11. The composite part as recited in claim 8, wherein the insert is substantially fully encased within the molded piece.

12. The composite part as recited in claim 8, wherein the composite part is part of an electronic device.

13. The composite part as recited in claim 8, wherein the insert is an electronic component.

14. The composite part as recited in claim 13, wherein the electronic component is a printed circuit board.

15. The composite part as recited in claim 8, wherein the first portion and the second portion create a watertight barrier between at least a portion of the insert and an outer environment.

16. The composite part as recited in claim 8, wherein the composite part includes two indentations formed during the injection molding process.

17. An electronic device, comprising:
    a printed circuit board having a first surface area and a second surface area; and
    a molded piece at least partially encasing the printed circuit board therein, the molded piece formed using an injection molding process, the molded piece comprising:
        a first portion disposed on the first surface area, the first portion including a recess that provides access to the second surface area of the printed circuit board,
        a second portion disposed on the second surface area via the recess, and
        an indentation disposed within the molded piece, the indentation formed during the injection molding process.

18. The electronic device as recited in claim 17, wherein the first portion and the second portion comprise the same material.

19. The electronic device as recited in claim 17, wherein the molded piece creates a watertight barrier between at least a portion of the printed circuit board and an outer environment.

20. The electronic device as recited in claim 17, wherein the indentation is proximate to the second portion.

\* \* \* \* \*